United States Patent
Beauvillain

(10) Patent No.: US 11,209,827 B2
(45) Date of Patent: Dec. 28, 2021

(54) METHOD AND ELECTRONIC DEVICE FOR CONTROLLING THE SPEED OF AN AUTONOMOUS VEHICLE, RELATED COMPUTER PROGRAM, AUTONOMOUS VEHICLE AND MONITORING PLATFORM

(71) Applicant: TRANSDEV GROUP, Issy les Moulineaux (FR)

(72) Inventor: Alexis Beauvillain, Massy (FR)

(73) Assignee: TRANSDEV GROUP INNOVATION, Issy-les-Moulineaux (FR)

( * ) Notice: Subject to any disclaimer, the term of this patent is extended or adjusted under 35 U.S.C. 154(b) by 324 days.

(21) Appl. No.: 16/262,192

(22) Filed: Jan. 30, 2019

(65) Prior Publication Data

US 2019/0235517 A1    Aug. 1, 2019

(30) Foreign Application Priority Data

Jan. 30, 2018   (FR) ..................................... 18 50749

(51) Int. Cl.
    *G05D 1/02*       (2020.01)
    *B60W 30/00*     (2006.01)

(52) U.S. Cl.
    CPC ........... *G05D 1/0223* (2013.01); *B60W 30/00* (2013.01); *G05D 1/0276* (2013.01); *G05D 2201/0213* (2013.01)

(58) Field of Classification Search
    CPC .............. G05D 1/0223; G05D 1/0276; G05D 2201/0213; B60W 30/00
See application file for complete search history.

(56) References Cited

U.S. PATENT DOCUMENTS

| 10,464,561 | B2 * | 11/2019 | Hubbard | B60W 30/146 |
| 2016/0129908 | A1 * | 5/2016 | Harda | G05D 1/0088 |
| | | | | 701/24 |

(Continued)

FOREIGN PATENT DOCUMENTS

| DE | 102007007730 A1 | 8/2008 |
| DE | 102013011538 A1 | 1/2015 |

OTHER PUBLICATIONS

Search Report for French Application No. 18 50749 dated Sep. 19, 2018.

(Continued)

*Primary Examiner* — Fadey S. Jabr
*Assistant Examiner* — Naeem Taslim Alam
(74) *Attorney, Agent, or Firm* — Pearne & Gordon LLP

(57) ABSTRACT

A speed control method for controlling the speed of an autonomous vehicle provided with at least one autonomous driving module and one geolocation module, the vehicle being capable of following a route, which is predefined and segmented according to at least one segmentation comprising of a plurality of segments, each associated with: an interval of geolocation data; and a set of values for nominal maximum travel speed of the autonomous vehicle, each speed value being associated with a distinct time slot; the method comprising: the acquisition, from the on-board geolocation module, of an instantaneous geolocation data item of the autonomous vehicle associated with a time instant; as a function of the instantaneous geo-location data item and the time instant, the determination, of the segment currently being traversed and/or to be traversed, and of the associated nominal maximum speed value.

8 Claims, 3 Drawing Sheets

(56) References Cited

U.S. PATENT DOCUMENTS

| | | | |
|---|---|---|---|
| 2016/0231746 A1* | 8/2016 | Hazelton | G01S 13/867 |
| 2018/0217607 A1* | 8/2018 | Ren | G06K 9/6201 |
| 2018/0259651 A1* | 9/2018 | Antoni | G01S 19/20 |
| 2019/0049914 A1* | 2/2019 | Munafo | G05D 1/0088 |
| 2019/0258251 A1* | 8/2019 | Ditty | G06K 9/00805 |

OTHER PUBLICATIONS

Andreas Reschka et al., "Safe, Dynamic and Comfortable Longitudinal Control for an Autonomous Vehicle", 2012 Intelligent Vehicles Symposium, 2012 IEEE, Jun. 3, 2012, pp. 346-351, Alcala de Henares, Spain.
Anonymous; "Adaptive cruise control", Wikipedia, the free encyclopedia, https://en.wikipedia.org/w/index.php?title=Adaptive_cruise_control&oldid=816168282, pp. 1-13, Dec. 19, 2017.

* cited by examiner

METHOD AND ELECTRONIC DEVICE FOR CONTROLLING THE SPEED OF AN AUTONOMOUS VEHICLE, RELATED COMPUTER PROGRAM, AUTONOMOUS VEHICLE AND MONITORING PLATFORM

FIELD OF THE INVENTION

The present invention relates to a speed control method for controlling the speed of an autonomous vehicle provided with at least one autonomous driving module and one geolocation module installed on board, the method being operationally implemented by an electronic control device.

The invention also relates to an associated computer program product.

The invention also relates to an electronic speed control device for controlling the speed of an autonomous vehicle, the autonomous vehicle being provided with at least one autonomous driving module and one geolocation module installed on board, the autonomous vehicle being capable of following a route, which is predefined and segmented according to at least one segmentation.

The invention also relates to an autonomous vehicle as defined here above.

The invention also relates to an external monitoring platform for monitoring an infrastructure for autonomous vehicles, at least one autonomous vehicle being as defined here above.

BACKGROUND OF THE INVENTION

The speed of an autonomous vehicle is automatically controlled by an autonomous driving module installed on board the autonomous vehicle. In the presence of an obstacle on the route of the autonomous vehicle, it is necessary to efficiently, quickly and automatically adjust the speed of the autonomous vehicle in order to minimize the severity of the collision and in particular the vital impact on pedestrians and/or passengers present within the vehicle(s) involved in the collision.

In order to achieve this, current techniques are based on obstacle perception and/or collision management tools for perceiving obstacles and/or managing collisions, these obstacle perception and/or collision management tools being capable of being installed on board within the autonomous vehicle or located outside the autonomous vehicle on and/or in the proximity of the route that is being followed. The disadvantage of these techniques is related to a possible defect or malfunction of these perception tools thereby resulting in a degradation of precision, or even a failure leading to a total shutdown of the autonomous vehicle or a road accident.

SUMMARY OF THE INVENTION

An objective of the invention is therefore to optimize road safety (in respect of nautical or air or indeed railway navigation or more generally transportation safety) associated with the displacement of an autonomous vehicle in a manner so as to minimize the severity of collision(s) involving an autonomous vehicle in particular in terms of human impact.

To this end, the object of the invention relates to a speed control method for controlling the speed of an autonomous vehicle provided with at least one autonomous driving module and one geolocation module installed on board, the autonomous vehicle being capable of following a route, which is predefined and segmented according to at least one segmentation, the segmentation comprising of a plurality of route segments each associated with
- an interval of geolocation data; and
- a set of values for nominal maximum travel speed of the autonomous vehicle, each speed value being associated with a time instant or a distinct time window;

the method being operationally implemented by an electronic control device and including:
- the acquisition, from the on-board geolocation module, of an instantaneous geolocation data item of the autonomous vehicle, associated with a time instant;
- the determination, as a function of the instantaneous geolocation data item and the time instant, within the segmentation of the route, of the segment currently being traversed and/or the subsequent segment to be traversed, and of the associated nominal maximum speed value, intended to be applied by the autonomous driving module.

Thus, thanks to the invention, the speed of the autonomous vehicle is controlled based on the spatio-temporal location of the autonomous vehicle, which makes it possible to relax the operating constraints of the obstacle perception tools and/or collision management tools, capable of being installed on board within the autonomous vehicle, and/or located on the exterior of the autonomous vehicle, while also ensuring a maximum permissible speed that is capable of minimizing the severity of a potential collision.

According to other advantageous aspects of the invention, the method comprises one or more of the following characteristic features, taken into consideration in isolation or in accordance with any technically possible combination(s):
- the method in addition includes:
- the receiving of an information item representative of the presence or absence of an element external to the autonomous vehicle that is capable, in case of contact with the autonomous vehicle, of disrupting the trajectory thereof over the segment currently being traversed and/or to be traversed, the information item being transmitted by at least one device external to the autonomous vehicle;
- on the basis of the said information item, the modification or maintenance respectively, of the associated nominal maximum speed value to be applied;
- the external element is classified according to multiple categories including at least:
- one other vehicle, that is separate and distinct from the autonomous vehicle,
- a pedestrian,
- a meteorological phenomenon;
- each category of external element is associated with a modification value for modifying the nominal maximum speed value;
- the modification value for modifying the nominal maximum speed value is a reduction value, and in which the reduction value associated with the external element category corresponding to the category 'other vehicle' is less than the reduction value associated with the external element category corresponding to the category 'pedestrian';
- the method in addition includes:
- the detecting of a defect or malfunction of the at least one external device,
- the switching to degraded mode, of the determination of the associated nominal maximum speed value, considering a worst case route course corresponding to the presence of an external element over the segment currently being traversed and/or to be traversed, the external element category corresponding to the category 'pedestrian';

the method in addition includes:

the receiving of update data for updating of the predefined route segmentation transmitted by an external monitoring platform of an infrastructure for autonomous vehicles, based on the update data, updating of the segmentation of the predefined route;

the autonomous vehicle is in addition provided with a clock, and the method furthermore comprises the transmission, to the external monitoring platform for processing and updating of the segmentation of the predefined route, of:

data representative of the presence of external element(s) over the predefined route, received from at least one external device external to the autonomous vehicle, and/or determined by means of at least one sensor installed on board the autonomous vehicle, and the associated moment of presence of the external element(s) as determined by means of the clock.

The invention also relates to a computer program comprising of software instructions, which upon being executed by a processor, operationally implement a method as defined here above.

The object of the invention also relates to a speed control device for controlling the speed of an autonomous vehicle, the autonomous vehicle being provided with at least one autonomous driving module and one geolocation module installed on board, the autonomous vehicle being capable of following a route, which is predefined and segmented according to at least one segmentation of the predefined route, the segmentation comprising of a plurality of route segments each associated with an interval of geolocation data; and a set of values for nominal maximum travel speed of the autonomous vehicle, each speed value being associated with a time instant or a distinct time window;

the device comprising:

a data acquisition module configured so as to acquire, from the geolocation module, a geolocation data item of the autonomous vehicle, associated with a time instant;

a segment determination module configured so as to determine, as a function of the instantaneous geo-location data item and the time instant, within the segmentation of the route, the segment currently being traversed and/or to be traversed, and the associated nominal maximum speed value, intended to be applied by the autonomous driving module.

The object of the invention also relates to an autonomous vehicle comprising at least one control device as defined here above.

According to an advantageous aspect of the invention, the autonomous vehicle presents the characteristic feature based on which the geolocation module and the clock are in compliance with a functional safety design effort level, ASIL D (Automotive Safety Integrity Level D).

The object of the invention also relates to an external monitoring platform for monitoring an infrastructure for autonomous vehicles, at least one autonomous vehicle comprising an autonomous driving module and one geolocation module installed on board, the said autonomous vehicle being capable of following a route, which is predefined and segmented according to at least one segmentation of the predefined route, the segmentation comprises a plurality of route segments each associated with an interval of geolocation data; and a set of values for nominal maximum travel speed of the autonomous vehicle, each speed value being associated with a time instant or a distinct time window;

the platform comprising at least one speed control device for controlling the speed of the said autonomous vehicle, the said control device being as defined here above.

BRIEF DESCRIPTION OF THE DRAWINGS

Other characteristic features and advantages of the invention will become apparent upon reading the description that follows, provided solely by way of non-limiting example, and with reference being made to the accompanying drawings, in which.

DETAILED DESCRIPTION OF PREFERRED EMBODIMENTS

Figure 1:
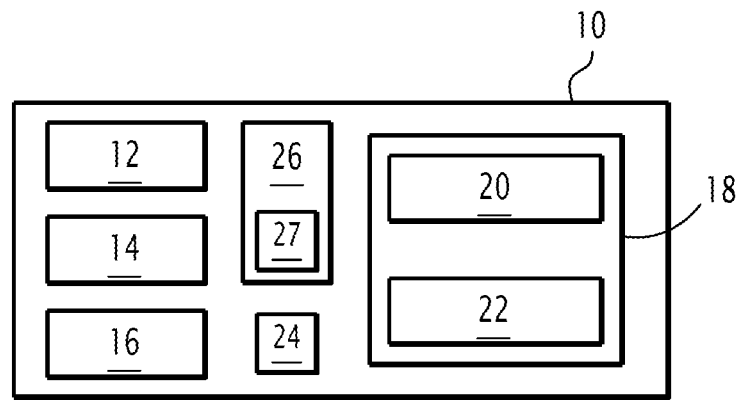
FIG. 1 is a schematic view of a set of elements of the architecture of the autonomous vehicle according to the present invention.

In the example shown in FIG. 1, the autonomous vehicle 10 is an autonomous car, an autonomous bus, an autonomous tramway, an autonomous train, or indeed any other autonomous public transport means, etc.

Such an autonomous vehicle 10 comprises, in a known manner (not represented), front wheels, rear wheels, a motor that is mechanically connected via a transmission chain to the front and/or rear wheels for driving the said wheels in rotation about their axis, a steering system, adapted to be able to act on the front and/or rear wheels of the autonomous vehicle 10 so as to modify the orientation of its trajectory, and a braking system adapted to be able to exert a braking force on the wheels of the autonomous vehicle 10.

According to the invention, such an autonomous vehicle 10 is also provided with at least one autonomous driving module 12, a clock 14 and one geolocation module 16 installed on board.

In the following, the term autonomous driving module 12 is understood to refer to a controller adapted to be able to control and drive the vehicle in an autonomous manner by receiving information pertaining to the environment of the autonomous vehicle 10 by means of sensors, located on the exterior or within the interior of the autonomous vehicle, and by acting on the engine (not shown), the steering system (not shown), and the braking system (not shown) in a manner so as to modify the speed and the trajectory of the autonomous vehicle 10 in reaction to the data and information received and in a manner so as to operate in compliance with a mission programmed within the controller.

In particular, such a mission corresponds to the following of a predefined route, such as, for example, the route followed by a bus line or tramway line or line of any other autonomous public transport means.

According to the present invention, such a route is segmented according to a plurality of route segments S1, S2, . . . Si, . . . , SN each associated with an interval of geolocation data; and a set of values for nominal maximum travel speed of the autonomous vehicle 10, each speed value being associated with a time instant or a time window; such as a time slot, that is distinct with $1 \leq i \leq N$.

For example, eleven time slots are considered: $C_1$: from 0:00 hr to 2:00 hr in the morning, $C_2$: 2:00 hr to 6:00 hr, $C_3$: from 6:00 hr to 8:00 hr, $C_4$: from 8:00 hr to 10:00 hr, $C_5$:

from 10:00 hr to 11:30 hr, $C_6$: from 11:30 hr to 14:00 hr, $C_7$: from 14:00 hr to 15:00 hr, $C_8$: from 15:00 hr to 16:30 hr, $C_9$: from 16:30 hr to 18:00 hr, $C_{10}$: from 18:00 hr to 20:30 hr, $C_{11}$: from 20:30 hr to 0:00 hr, and for a given segment Si, eleven speed values $Vmax_1$, $Vmax_2$, ..., $Vmax_{11}$ are respectively associated therewith.

For example, for a segment Si and/or Si+1 corresponding to a geographical location in the proximity of a school, the speed $Vmax_2$ associated with the time slot $C_2$: 2:00 hr to 6:00 hr is 50 km/h while the speed $Vmax_8$ associated with the time slot $C_8$: from 15:00 hr to 16:30 hr is 30 km/h so as to slow down traffic at the end of the school day when classes are let out which is synonymous with high pedestrian density.

The term 'nominal maximum travel speed' is understood to refer to a maximum travel speed which is to be taken into account by the autonomous driving module 12, by way of a speed of travel that is not to be exceeded. In other words, a speed set point for the autonomous vehicle 10 will be lower than the said nominal maximum travel speed. The person skilled in the art will nevertheless understand that the maximum speed of travel of the autonomous vehicle 10 is quite likely to be temporarily higher than this nominal maximum travel speed, for example in the presence of external circumstances that cause an unexpected acceleration of the autonomous vehicle 10.

In the subsequent section(s), the term 'clock' 14, is understood to refer to an instrument that is capable of measuring the time or of outputting a time indicator.

In the subsequent section(s), the term 'geolocation module' 16, is understood to refer to an instrument that is capable of positioning the autonomous vehicle 10 on a plan or a map by using its geographical coordinates. Such a geolocation module 16 is capable of being located and tracked, for example by making use of a satellite positioning system, of receiving its geographical positioning in real time, for example, via a GPS receiver and of disseminating it in real time.

Other geolocation techniques may possibly be used according to the invention, such as geolocation with geocoder, with GSM, with WiFi, by using an inertial unit, a radar or even a lidar.

Such geolocation techniques are according to one particular aspect of the invention optimized by means of a map-based tracking technique (referred to as "Map Matching") or indeed a technique based on simultaneous mapping and localization (referred to by the acronym SLAM for "Simultaneous localization and mapping").

According to one particular aspect of the invention, the geolocation module 16 and the clock 14 are in compliance with a functional safety design effort level, ASIL D (ASIL being the acronym for "Automotive Safety Integrity Level"), such a level ASIL D representing the maximum degree of rigour required in order to ensure the safety requirements associated with a maximum level of danger. The ASIL is by definition obtained by multiplying a triplet of values respectively representative of three safety criteria namely severity, exposure, and controllability.

In other words, during the designing of the autonomous vehicle 10 according to the present invention, the maximum level of precision in terms of time indication(s) outputted by the clock 14 and in terms of precision of geographical geolocation of the autonomous vehicle 10 delivered by the geolocation module 16 is required.

According to the invention, the speed of the autonomous vehicle 10 is controlled, that is to say monitored, or indeed managed, by an electronic control device 18.

In the example shown in FIG. 1, the autonomous vehicle 10 comprises the electronic control device 18.

By way of a variant, not represented, the electronic control device 18 is separate and distinct from the autonomous vehicle 10 and external to the latter. According to this variant, the electronic control device 18 is for example included in an external monitoring platform for monitoring an infrastructure for autonomous vehicles.

The electronic control device 18 is configured so as to control, that is to say, monitor, or indeed manage the speed of the autonomous vehicle 10, and comprises a data acquisition module 20 that is configured so as to acquire, from the geolocation module 16, for example in real time, an instantaneous geolocation data item of the autonomous vehicle associated with a time instant t.

The electronic control device 18 comprises a segment determination module 22 that is configured so as to determine, as a function of the instantaneous geolocation data and the time instant t, within the segmented route, the segment currently being traversed and/or to be traversed, and the associated nominal maximum speed value, intended to be applied by the autonomous driving module 12.

Moreover, according to one particular aspect, the autonomous vehicle 10 also comprises a sensor 24 or an assembly of sensors 24 capable of determining and outputting at least one data item representative of the presence of external element(s) over the predefined route.

The term "external element over the predefined route" is understood to refer to any element that is capable of disrupting the predefined route of the autonomous vehicle 10, whether it be by deviation capable of causing an exit from the segment, by unplanned stopping over the course of the predefined route such as the stopping following an accident, by modification of the speed normally associated in the absence of this external element with the travel of the vehicle over the segment currently being traversed and/or to be traversed.

In particular, according to the present invention, the external element is classified according to several categories comprising at least:

one other vehicle, that is separate and distinct from the autonomous vehicle 10,
a pedestrian,
a meteorological phenomenon such as wind, rain, ice, snow ...,
etc.

Finally, the autonomous vehicle 10 comprises at least one dedicated memory storage 26, or a dedicated memory space 26, of a memory storage unit that is also used for other data storage applications of the autonomous vehicle 10, dedicated to the storage of the segmentation 27 of the predefined route of the autonomous vehicle 10.

In the example shown in FIG. 1, the electronic control device 18 comprises an information processing unit formed for example of a memory storage and a processor associated with the memory storage, not represented.

In the example shown in FIG. 1, the data acquisition module 20 and the segment determination module 22 are each produced in the form of a software application, or a software component unit, executable by the processor. The memory storage of the electronic control device 18 is thus then able to store a data acquisition software application for acquisition, from the geolocation module 16, of an instantaneous geolocation data item of the autonomous vehicle, associated with a time instant t and a segment determination software for determination, as a function of the instantaneous geolocation data and the time instant t, within the segmented route, of the segment currently being traversed and/or to be traversed, and the associated nominal maximum speed value, intended to be applied by the autonomous driving module 12. The processor is thus then capable of executing each of the software applications among the acquisition software and the determination software applications.

By way of a variant that is not represented, the data acquisition module 20 and the segment determination module 22 are each produced in the form of a programmable logic component, such as an FPGA (abbreviated from Field Programmable Gate Array), or even in the form of a dedicated integrated circuit, such as an ASIC (abbreviated from Application Specific Integrated Circuit).

When the electronic control device 18 is produced in the form of one or more software applications, that is to say in the form of a computer program, it is additionally also able to be recorded on a medium, not shown, which is readable by a computer. The computer-readable medium is, for example, a medium that is capable of saving and storing electronic instructions and being coupled to a bus of a computer system. By way of example, the readable medium is a diskette or flexible disk (that is to say Floppy Disk), an optical disk, a Compact Disc-Read-Only Memory (CD-ROM), a magneto-optical disk, a Read-Only Memory (ROM), a Random-Access Memory (RAM), any type of non-volatile memory [for example Electrically Programmable Read Only Memory (EPROM), Electrically Erasable Programmable Read-Only Memory (EEPROM), FLASH, Non-Volatile Random-Access Memory (NVRAM)], a magnetic card or an optical card. On the readable medium is then saved and stored a computer program including software instructions.

Such a segmentation 27 is for example obtained initially from an external transportation database (not shown) to the autonomous vehicle 10, for example a database provided by the Service Technique des Remontées Mécaniques et des Transports Guidés (STRMTG) [Technical Service for Mechanical Ski Lifts and Guided-Automated Transport Systems] or any other autonomous public transportation service.

According to one variant, the autonomous vehicle 10 is capable of traversing a plurality of distinct predefined geographical routes each associated respectively with a segmentation 27 that is specific to them and saved and stored within the memory storage or the dedicated memory space 26.

Figure 2:
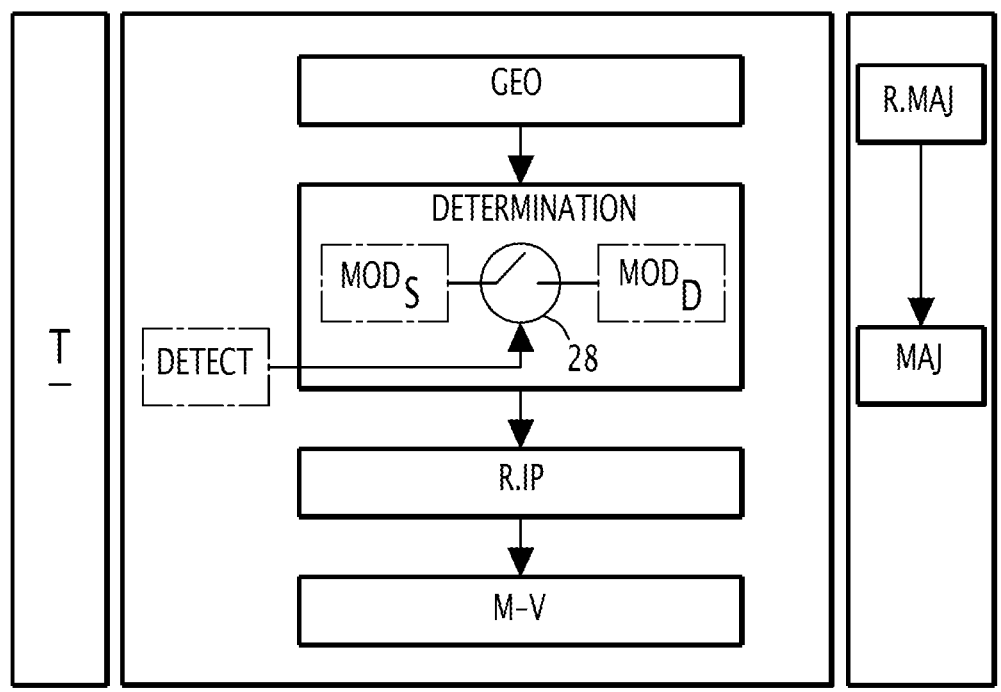
FIG. 2 is a block diagram, of an example according to the invention, of a speed control method for controlling the speed of an autonomous vehicle according to FIG. 1.

The speed control method for controlling the speed of an autonomous vehicle 10 previously described will now be described with reference to FIG. 2 illustrating a flowchart of the steps thereof as operationally implemented by the electronic control device 18.

More precisely, the electronic control device 18 is capable of operationally implementing, via its acquisition module 20, a step GEO of acquisition, for example in real time and from the geolocation module 16, of an instantaneous geolocation data item of the autonomous vehicle 10 associated with a time instant t.

Then, according to a subsequent step DETERMINATION, as a function of the instantaneous geolocation data and the time instant t, the control device 18 determines, via its segment determination module 22 and within the segmentation 27 of the route, the segment Si currently being traversed and/or the segment Si+1 to be traversed, and the nominal maximum speed value Vmax, associated with this segment Si or with the segment Si+1 determined, to be applied by the autonomous driving module 12.

In other words, according to the invention, the speed of the autonomous vehicle 10 is automatically servo-controlled based on its spatio-temporal location, for example in real time.

The term 'real time', is typically understood to refer respectively to an acquisition, or a servo-control process performed in a period of time that is less than a predefined threshold, typically in a period of time less than 10 ms.

In other words, the instantaneous geolocation data item of the autonomous vehicle 10 outputted by the geolocation module 16 is automatically compared (ie without human intervention) by the electronic control device 18 to the segmentation 27 of the predefined route. During this comparison, the segment Si whose geolocation data interval includes the instantaneous geolocation data item of the autonomous vehicle 10 is identified as the segment Si currently being traversed by the autonomous vehicle 10.

Such a segment Si is also associated within the segmentation 27 to a set of nominal maximum traveling speed values of the autonomous vehicle 10, each speed value being associated with a time instant or with a distinct time slot with $1 \leq i \leq N$. The time instant t associated with the instantaneous geolocation data item is thus then automatically compared to each time window, for example to each time slot, in order to determine the one including it, and the nominal maximum displacement speed value of the autonomous vehicle 10, associated both with this segment Si and with this time slot, is then obtained with a view to its automatic and immediate application by the autonomous driving module 12.

The term 'immediate application', is typically understood to refer to an application effected within a period of time that is less than a predefined threshold, typically within a period of time that is less than 10 ms.

According to an alternative or in addition, the subsequent segment Si+1 to be traversed is considered in order to anticipate the maximum speed set point to be transmitted to the autonomous driving module 12. According to this aspect, the autonomous vehicle 10 will then be able to determine the maximum speed at which it would have to travel even before entering the subsequent segment Si+1 to be traversed.

Thus, such a spatio-temporal location makes it possible to take into account both the hazards associated with the infrastructure of the route course (road or rail or even naval of the trip) and the dangers related to the temporal probability of emergence of an external element capable of disrupting the predetermined route of the autonomous vehicle 10.

For example, in the proximity of a public building, such as a school, the presence of pedestrians is higher at the usual hours of start and end of classes than outside of these class hours.

According to a first additional and optional variant embodiment, the method according to the present invention also includes a step $R\_I_p$ for receiving of an information item $I_p$ representative of the presence or absence of an element external to the autonomous vehicle 10 that is capable, in the event of contact with the autonomous vehicle 10, of disrupting the trajectory over the segment currently being traversed and/or to be traversed, the information item being transmitted by at least one device external to the autonomous vehicle 10.

Such an external device is for example, a presence detector placed in the proximity of a pedestrian crossing, an intersection, a speed bump, etc. Such a presence detector corresponds for example to a camera, to a motion detector, to one or more lidars, or even to one or more radars.

According to another variant, such an external device corresponds to the external monitoring platform for monitoring an infrastructure for autonomous vehicles, the platform being adapted to be able to receive one or more information item(s) $I_p$ representative of the presence of one or a plurality of element(s) external to the autonomous vehicle that are potentially capable of penetrating on to the upcoming route of the autonomous vehicle, or indeed potentially capable of disrupting the route, and capable of transmitting a signal representative of the potential global disruption of the route of the autonomous vehicle.

In other words, based on multiple entries corresponding to data related to perception of external disrupting element(s) transmitted by multiple presence detectors or from meteorological reports or traffic information reports produced by the information generation devices external to the autonomous vehicle 10 and/or external to the monitoring platform, the monitoring platform is capable of generating and transmitting to the autonomous vehicle 10 a signal synthesizing all of these information items representative of potential disruptions of the autonomous vehicle and capable of indicating the category of external element and the speed modification value to be taken into account.

Then, according to this first additional and optional variant embodiment, as a function of the said information $I_p$ representative of the presence or absence of an external element, the method comprises a step M_V of modification or maintenance respectively, for modifying or maintaining the associated nominal maximum speed value to be applied, previously obtained based on solely the instantaneous geolocation data item associated with the time instant of its being obtained by geolocation t.

In other words, such a first variant makes it possible to reinforce the optimization of the speed of the autonomous vehicle 10 by enhancing it with a perception of the external environment currently being traversed or to be traversed.

According to one particular characteristic feature of this first variant, each category of external element is associated with a modification value for modifying the nominal maximum speed value which is specific thereto.

In particular, the modification value for modifying the nominal maximum speed value is a reduction value, and the reduction value associated with the external element category corresponding to the category 'other vehicle' is less than the reduction value associated with the external element category corresponding to the category 'pedestrian'.

In other words, according to such a rule of association between external element category and speed reduction value, the reduction of the permissible nominal maximum speed value is greater in the presence of a pedestrian than in the presence of another vehicle, the potential gravity of an inter-vehicle collision, in terms of human impact, being less than that associated with a vehicle-pedestrian collision.

According to another optional additional aspect, which may be cumulative or not with the first variant embodiment mentioned above, the method in addition includes:

the detection DETECT of a malfunction of the said at least one external device, the switching 28 to degraded mode $MOD_D$, of the determination DETERMINATION of the associated nominal maximum speed value to be applied by the autonomous driving module 12, considering a worst case route course corresponding to the presence of an external element over the segment currently being traversed and/or to be traversed, the external element category corresponding to the category associated with a maximum reduction value for reducing the speed of the autonomous vehicle 10, for example that associated with the category 'pedestrian'.

In other words, in the event of malfunction or failure of the external devices that are capable of enabling an optimized adjustment of the speed limitation of the autonomous vehicle 10, the worst-case safety situation of the route currently being traversed is taken into account, in order to consequently slow down the autonomous vehicle 10 and thereby to limit the severity of a potential accident.

For example, the detection becomes effective when, after a predetermined period, the autonomous vehicle 10 detects no signal being emitted by the external device in the vicinity of which it is travelling, or by receiving a failure alert message indicating failure of this device, transmitted by the monitoring platform in particular in case of bad weather conditions (eg frosting-freezing or heat wave) that are capable of deteriorating the operation thereof.

According to one other aspect of the invention, the method in addition includes:

the receiving R_MAJ of at least one update data item for updating of the segmentation 27 of the predefined route transmitted by the external monitoring platform for monitoring an infrastructure for autonomous vehicles; and based on the said at least one update data item, updating of the segmentation 27 of the predefined route saved-stored in the memory storage 26 or the dedicated memory space 26 of the autonomous vehicle 10 or indeed of the electronic control device 18, when the latter is external to the autonomous vehicle 10, the segmentation 27 of the predefined route being thus then in effect saved and stored within the electronic control device 18.

Such an aspect makes it possible in particular to take into account in real time any deviation from the predefined route of the autonomous vehicle 10. According to one particular aspect, such an updated segmentation 27 is able to be stored with a version number that is distinct from the segmentation version 27 previously stored and used, and as may be appropriate to be subsequently deleted, upon request from the monitoring platform, when for example a temporary deviation from the route of the autonomous vehicle 10 is no longer actually the case.

According to another complementary and optional aspect, the method in addition includes the transmission T, via a transmission module not represented, for example an on board radio transmitter-receiver (transceiver) installed within the autonomous vehicle 10, to the external monitoring platform, for processing and updating of the segmentation 27 of the predefined route, of:

at least one data item representative of the presence of external element(s) over the predefined route, received from at least one external device of the autonomous vehicle 10, and/or determined by means of at least one on board sensor 24 installed aboard the autonomous vehicle 10, and the associated moment of presence of the external element(s) (time instant at which present) as determined by means of the clock 14.

The person skilled in the art will understand that, when the electronic control device 18 is included in the external monitoring platform, the aforementioned transmission is carried out internally within the said monitoring platform.

In other words, according to this complementary aspect, the autonomous vehicle 10 is itself capable of participating in the reporting back of spatio-temporal data and information representative of the presence of external element(s) that are capable of potentially disrupting the effective completion of the predefined course route that is intended to traverse in a repetitive manner. In other words, the autonomous vehicle is itself a source of updating of the segmentation related information of its own predefined route.

In connection with FIGS. 3 to 5, an example of application of the method according to the present invention is described here below.

Figure 3:
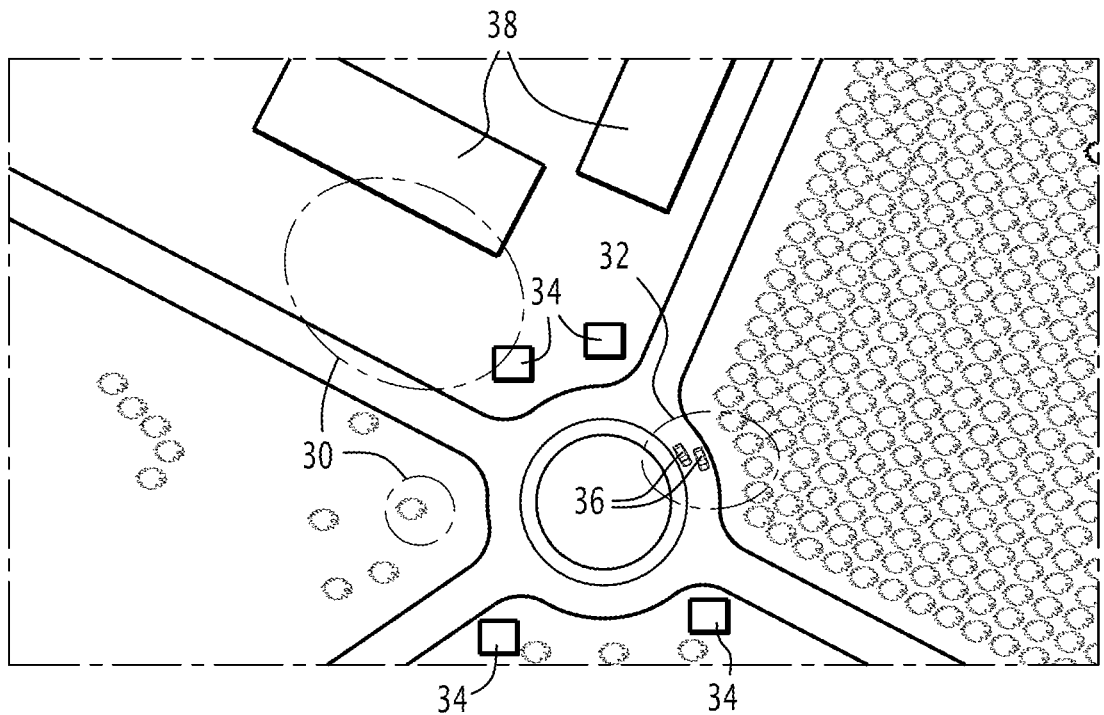
FIGS. 3 to 5 illustrate an application of the method according to the invention.

In FIG. 3, a geographic sector in particular comprising of a traffic round-about able to be traversed by the autonomous vehicle 10 during its predefined route is represented as at a given time slot Ci.

Over this sector, the zones 30 associated with a high pedestrian density as well as the zone 32 associated with an average vehicular density are represented.

In addition in the proximity of the lanes, pedestrian crosswalks, intersection, a plurality of external devices 34 have been installed.

In the zone 32 associated with an average vehicle density, two vehicles 36 are present.

The zones 30 associated with a high pedestrian density correspond in particular to green spaces, pedestrian zones, entry/exit zones of buildings 38, for example a university restaurant and a faculty.

Figure 4:
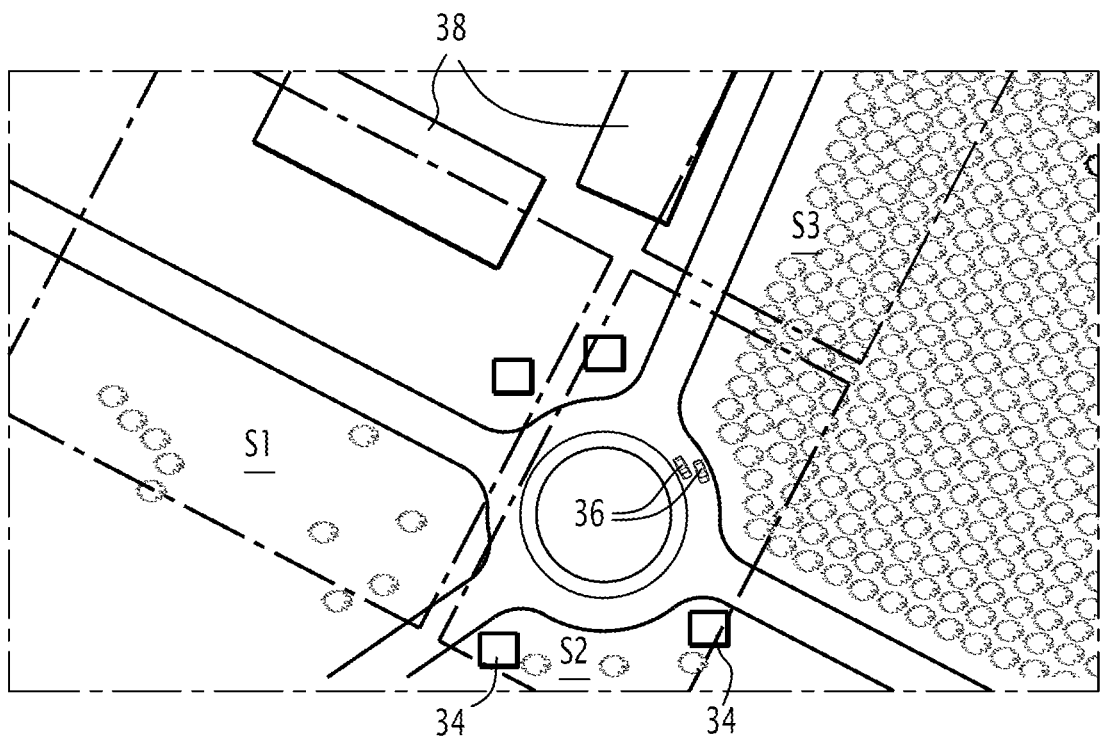

In FIG. 4, the segmentation of a part of the predefined route course capable of being followed by the autonomous vehicle 10 according to the invention is represented, this part comprising of three segments S1, S2, and S3, in a manner such that the autonomous vehicle 10 enters the traffic round-about and exits therefrom by the third exit which amounts to making via the round-about a turn on the left in relation to its access point to the round-about.

Figure 5:
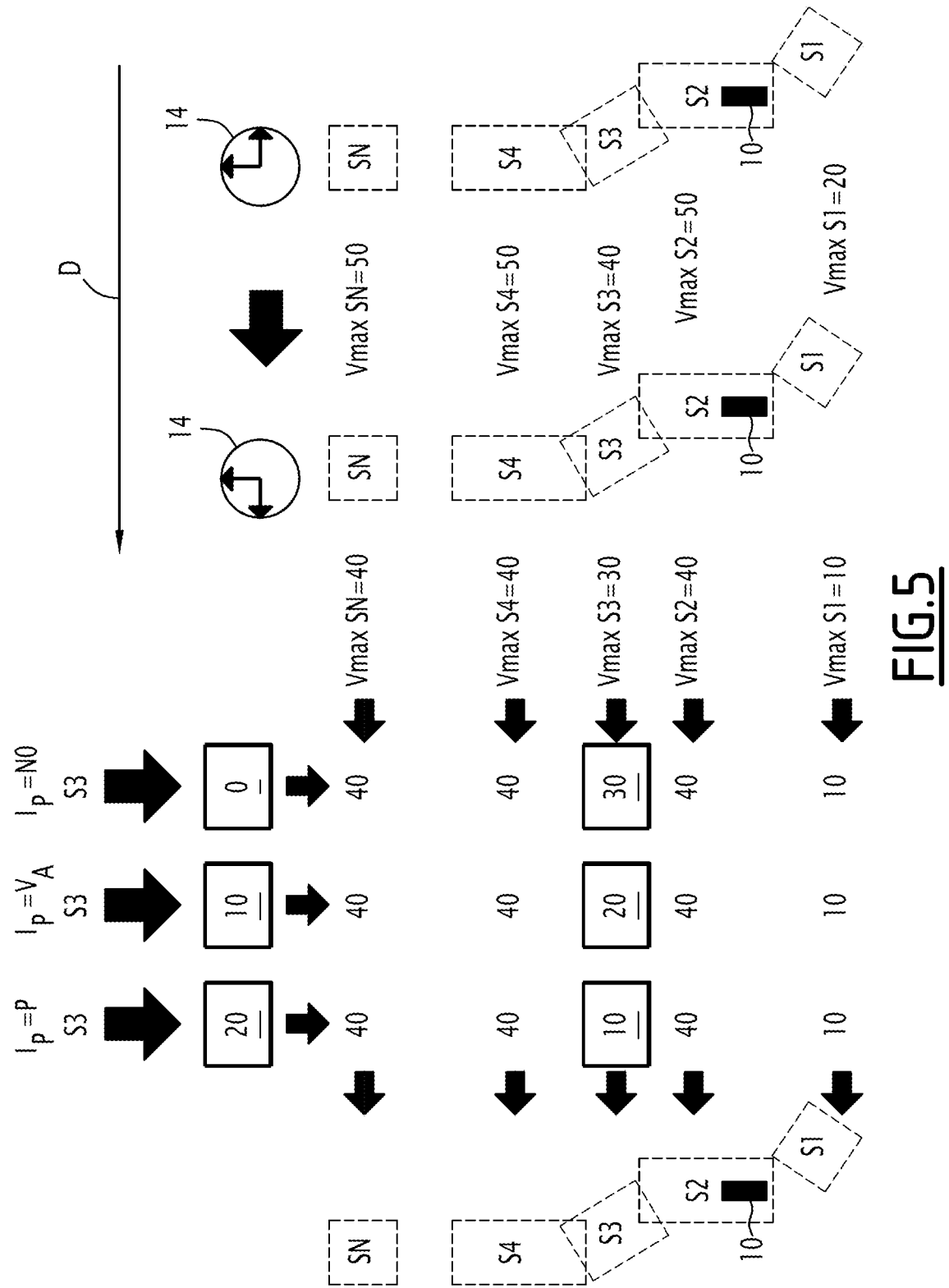

FIG. 5 schematically illustrates the adjustment of speed (ie the speed limitation of the autonomous vehicle 10) that is operationally implemented according to the invention in such a situation of geographical displacement of the vehicle.

Such an adjustment of speed is operationally implemented along the direction D.

The predefined route of the autonomous vehicle is segmented into N segments S1, S2, S3, S4, . . . , SN respectively associated for a time instant by default corresponding to 15:00 hr at the speeds Vmax S1=20 km/h, Vmax S2=50 km/h, Vmax S3=40 km/h, Vmax S4=50 km/h, Vmax SN=50 km/h.

More precisely, according to the first step of the method, the acquisition GEO, from the geolocation module 16, of an instantaneous geolocation data item of the autonomous vehicle 10 associated with a time instant t is operationally implemented. The instantaneous geolocation data obtained from the autonomous vehicle 10 corresponds to geographical coordinates included in the geolocation data interval of the segment S2, that is to say at the level of the round-about.

The time instant t of data obtainment is 9:00 hr, and differs from the default time corresponding to 15:00 hr, such that the segment determination module 22 applies the speeds associated with this time instant t of 9:00 hr: Vmax S1=10 km/h, Vmax S2=40 km/h, Vmax S3=30 km/h, Vmax S4=40 km/h, Vmax SN=40 km/h.

In other words, for the time slot that includes the time 9:00 hr, the maximum speed permissible over each segment of the route of the autonomous vehicle 10 is 10 km/h less than that associated with the time slot that includes the time 15:00 hr, which may be explained by the fact that for example according to the known data, derived from observation or statistics, for example accessible from the STRMTG database in this segment S2 the value of the vehicular density and/or pedestrian density is higher at 9:00 hr than at 15:00 hr, and that a deceleration programmed at 9:00 hr as compared to the speed applied at 15:00 hr of the autonomous vehicle is operationally implemented automatically according to the present invention in order to limit the severity of a possible eventual accident involving the autonomous vehicle 10.

Then, according to the first optional and additional variant embodiment previously described above, the method according to the present invention also includes a step $R\_I_p$ for receiving of an information item $I_p$ representative of the presence "P", "$V_A$" or the absence "NO" of an element external to the autonomous vehicle 10 that is capable, in the event of contact with the autonomous vehicle 10, of disrupting the trajectory over the segment S3 to be traversed, the information item being transmitted by at least one device 34 external to the autonomous vehicle 10.

In this case, according to the example shown in FIG. 5, if the information item $I_p$ is representative of the absence "NO" of any external element that is potentially capable of disrupting the route over the segment to be traversed S3, no further adjustment of the associated maximum speed is applied, Vmax S3=30 km/h is then maintained as speed set point to be applied by the autonomous driving module 12.

If the information item $I_p$ is representative of the presence of another vehicle $V_A$ that is potentially capable of disrupting the route over the segment to be traversed S3, an additional adjustment of the associated maximum speed is applied:

Vmax S3=30−10=40 km/h is thus then obtained as speed set-point to be applied by the autonomous driving module 12.

If the information item $I_p$ is representative of the presence of a pedestrian P who is potentially capable of disrupting the route over the segment to be traversed S3, an additional adjustment of the associated maximum speed is applied Vmax S3=30−20=10 km/h is then obtained as the speed set-point to be applied by the autonomous driving module 12.

The speeds associated with the other segments S1, S2, or S4 to SN are not modified in the absence of representative information $I_p$ received for these segments.

It is thus conceivable that the present invention offers an autonomous speed control method which makes it possible to determine automatically (ie without human intervention) the maximum speed at which the autonomous vehicle 10 is to or shall have to travel respectively, over the current segment, and the subsequent segment, which makes it possible to limit the safety design effort for the external or on board detection devices for detecting the presence or absence of external element capable of disrupting the route of the autonomous vehicle over these segments.

In particular, when the electronic control device 18 is installed on board the autonomous vehicle 10, the autonomous vehicle 10 itself automatically determines the maximum speed at which it is to or shall have to travel respectively, over the current segment, and the subsequent segment, which makes it possible to further limit this design effort.

Thus, it is possible to require a functional safety design effort level ASIL D for the sensitivity of the clock 14 and of the geolocation module 16, while the functional safety design effort level for the external or on board detection devices for detecting the presence or absence of external elements capable of disrupting the route is "relaxed" to a level for example ASIL A, which makes it possible to obtain an overall functional safety design effort level ASIL C for the autonomous transport infrastructure and associated autonomous vehicles.

The invention claimed is:

1. A speed control method for controlling a speed of an autonomous vehicle provided with at least one autonomous driving module and one geolocation module installed on board, the autonomous vehicle being configured to follow a route, which is predefined and segmented according to at least one segmentation, the segmentation comprising a plurality of route segments each associated with:
   an interval of geolocation data; and
   a set of values for nominal maximum travel speed of the autonomous vehicle, each nominal maximum travel speed value being associated with a time instant or a distinct time window, the method being operationally implemented by an electronic control device and comprising:
   acquiring from the geolocation module of an instantaneous geolocation data item of the autonomous vehicle, associated with a time instant;
   determining, as a function of the instantaneous geolocation data item and the time instant, within the segmentation of the route, the segment currently being traversed and/or the subsequent segment to be traversed, and the associated nominal maximum travel speed value, applied by the autonomous driving module;
   receiving an information item representative of a presence or absence of an element external to the autonomous vehicle that is capable, in case of contact with the autonomous vehicle, of disrupting the trajectory thereof over the segment currently being traversed and/or to be traversed, the information item being transmitted by at least one device external to the autonomous vehicle, wherein the external element is classified according to multiple categories including at least:
      one other vehicle, that is separate and distinct from the autonomous vehicle;
      a pedestrian; and
      a meteorological phenomenon;
   modifying or maintaining, on the basis of the said information item, the associated nominal maximum travel speed value to be applied;
   detecting a defect or malfunction of the at least one external device; and
   switching to a degraded mode, the determination of the associated nominal maximum travel speed value, considering a worst case route course corresponding to the presence of the external element over the segment currently being traversed, the external element category corresponding to the category associated with a maximum reduction value for reducing speed,
   wherein the autonomous vehicle is driven at a particular speed by the autonomous driving module based on the associated nominal maximum travel speed value,
   wherein each category of external element is associated with a modification value for modifying the associated nominal maximum travel speed value, and
   wherein the modification value for modifying the nominal maximum travel speed value is a reduction value, and the reduction value associated with the external element category corresponding to the category 'other vehicle' is less than the reduction value associated with the external element category corresponding to the category 'pedestrian'.

2. A method according to claim 1, wherein the method further comprises:
   receiving at least one update data item for updating of the segmentation of the predefined route transmitted by an external monitoring platform for monitoring an infrastructure for autonomous vehicles; and
   based on the said at least one update data item, updating the segmentation of the predefined route.

3. A method according to claim 2, wherein the autonomous vehicle is further provided with a clock, and the method further comprises transmitting to the external monitoring platform, for processing and updating of the segmentation of the predefined route:
   at least one data item representative of a presence of external element(s) over the predefined route, received from at least one external device of the autonomous vehicle, and/or determined by means of at least one on board sensor installed aboard the autonomous vehicle; and
   the associated moment of presence of the external element (s) as determined by the clock.

4. A non-transitory computer-readable medium having instructions stored thereon, which upon being executed by a processor, operationally implement a speed control method for controlling a speed of an autonomous vehicle provided with at least one autonomous driving module and one geolocation module installed on board, the autonomous vehicle being configured to follow a route, which is predefined and segmented according to at least one segmentation, the segmentation comprising a plurality of route segments each associated with:
   an interval of geolocation data; and
   a set of values for nominal maximum travel speed of the autonomous vehicle, each nominal maximum travel speed value being associated with a time instant or a distinct time window, the method being operationally implemented by an electronic control device and comprising:
   acquiring from the geolocation module of an instantaneous geolocation data item of the autonomous vehicle, associated with a time instant;
   determining, as a function of the instantaneous geolocation data item and the time instant, within the segmentation of the route, the segment currently being traversed and/or the subsequent segment to be traversed, and the associated nominal maximum travel speed value, applied by the autonomous driving module;
   receiving an information item representative of a presence or absence of an element external to the autonomous vehicle that is capable, in case of contact with the autonomous vehicle, of disrupting the trajectory thereof over the segment currently being traversed and/or to be traversed, the information item being transmitted by at least one device external to the autonomous vehicle, wherein the external element is classified according to multiple categories including at least:
      one other vehicle, that is separate and distinct from the autonomous vehicle;
      a pedestrian; and
      a meteorological phenomenon;
   modifying or maintaining, on the basis of the said information item, the associated nominal maximum travel speed value to be applied;
   detecting a defect or malfunction of the at least one external device; and
   switching to a degraded mode, the determination of the associated nominal maximum travel speed value, considering a worst case route course corresponding to the presence of the external element over the segment currently being traversed, the external element category corresponding to the category associated with a maximum reduction value for reducing speed,
wherein the autonomous vehicle is driven at a particular speed by the autonomous driving module based on the associated nominal maximum travel speed value,
wherein each category of external element is associated with a modification value for modifying the associated nominal maximum travel speed value, and
wherein the modification value for modifying the nominal maximum travel speed value is a reduction value, and the reduction value associated with the external element category corresponding to the category 'other vehicle' is less than the reduction value associated with the external element category corresponding to the category 'pedestrian'.

5. A speed control device for controlling a speed of an autonomous vehicle, the autonomous vehicle being provided with at least one autonomous driving module and one geolocation module installed on board, the autonomous vehicle being configured to follow a route, which is predefined and segmented according to at least one segmentation, the segmentation comprising a plurality of route segments each associated with:
an interval of geolocation data; and
a set of values for nominal maximum travel speed of the autonomous vehicle, each nominal maximum travel speed value being associated with a time instant or a distinct time slot, wherein the device comprises a controller configured to:
acquire, from the geolocation module, an instantaneous geolocation data item of the autonomous vehicle, associated with a time instant;
determine, as a function of the instantaneous geolocation data item and the time instant within the segmentation of the route, the segment currently being traversed and/or the subsequent segment to be traversed, and the associated nominal maximum travel speed value, applied by the autonomous driving module;
receive an information item representative of a presence or absence of an element external to the autonomous vehicle that is capable, in case of contact with the autonomous vehicle, of disrupting the trajectory thereof over the segment currently being traversed and/or to be traversed, the information item being transmitted by at least one device external to the autonomous vehicle, wherein the external element is classified according to multiple categories including at least:
one other vehicle, that is separate and distinct from the autonomous vehicle;
a pedestrian; and
a meteorological phenomenon;
modify or maintain, on the basis of the said information item, the associated nominal maximum travel speed value to be applied;
detect a defect or malfunction of the at least one external device; and
switch to a degraded mode, the determination of the associated nominal maximum travel speed value, considering a worst case route course corresponding to the presence of the external element over the segment currently being traversed, the external element category corresponding to the category associated with a maximum reduction value for reducing speed,
wherein the autonomous vehicle is driven at a particular speed by the autonomous driving module based on the associated nominal maximum travel speed value,
wherein each category of external element is associated with a modification value for modifying the associated nominal maximum travel speed value, and
wherein the modification value for modifying the nominal maximum travel speed value is a reduction value, and the reduction value associated with the external element category corresponding to the category 'other vehicle' is less than the reduction value associated with the external element category corresponding to the category 'pedestrian'.

6. An autonomous vehicle comprising:
at least one autonomous driving module and one geolocation module installed on board, the autonomous vehicle being configured to follow a route, which is predefined and segmented according to at least one segmentation of the predefined route, the segmentation comprising a plurality of route segments each associated with:
an interval of geolocation data; and
a set of values for nominal maximum travel speed of the autonomous vehicle, each nominal maximum travel speed value being associated with a time instant or a distinct time slot; and
a speed control device configured to control a speed of the autonomous vehicle, the device comprising a controller configured to:
acquire, from the geolocation module, an instantaneous geolocation data item of the autonomous vehicle, associated with a time instant;
determine, as a function of the instantaneous geolocation data item and the time instant within the segmentation of the route, the segment currently being traversed and/or the subsequent segment to be traversed, and the associated nominal maximum travel speed value, applied by the autonomous driving module;
receive an information item representative of a presence or absence of an element external to the autonomous vehicle that is capable, in case of contact with the autonomous vehicle, of disrupting the trajectory thereof over the segment currently being traversed and/or to be traversed, the information item being transmitted by at least one device external to the autonomous vehicle, wherein the external element is classified according to multiple categories including at least:
one other vehicle, that is separate and distinct from the autonomous vehicle:
a pedestrian; and
a meteorological phenomenon;
modify or maintain, on the basis of the said information item, the associated nominal maximum travel speed value to be applied;
detect a defect or malfunction of the at least one external device; and
switch to a degraded mode, the determination of the associated nominal maximum travel speed value, considering a worst case route course corresponding to the presence of the external element over the segment currently being traversed, the external element category corresponding to the category associated with a maximum reduction value for reducing speed,
wherein the autonomous vehicle is driven at a particular speed by the autonomous driving module based on the associated nominal maximum travel speed value, wherein each category of external element is associated with a modification value for modifying the associated nominal maximum travel speed value, and wherein the modification value for modifying the nominal maximum travel speed value is a reduction value, and the reduction value associated with the external element category corresponding to the category 'other vehicle' is less than the reduction value associated with the external element category corresponding to the category 'pedestrian'.

7. An autonomous vehicle according to claim 6, wherein the autonomous vehicle is in addition provided with a clock, and the geolocation module and the clock are in compliance with a functional safety design effort level, ASIL D (Automotive Safety Integrity Level D).

8. An external monitoring platform for monitoring an infrastructure for autonomous vehicles, at least one autonomous vehicle comprising an autonomous driving module and one geolocation module installed on board, the autonomous vehicle being configured to follow a route, which is predefined and segmented according to at least one segmentation of the predefined route, the segmentation comprising a plurality of route segments each associated with an interval of geolocation data; and a set of values for nominal maximum travel speed of the autonomous vehicle, each nominal maximum travel speed value being associated with a time instant or a distinct time slot, the platform comprising a speed control device and being configured to control a speed of the autonomous vehicle, the speed control device comprising a controller configured to:

acquire, from the geolocation module, an instantaneous geolocation data item of the autonomous vehicle, associated with a time instant;

determine, as a function of the instantaneous geolocation data item and the time instant within the segmentation of the route, the segment currently being traversed and/or the subsequent segment to be traversed, and the associated nominal maximum travel speed value, applied by the autonomous driving module;

receive an information item representative of a presence or absence of an element external to the autonomous vehicle that is capable, in case of contact with the autonomous vehicle, of disrupting the trajectory thereof over the segment currently being traversed and/or to be traversed, the information item being transmitted by at least one device external to the autonomous vehicle, wherein the external element is classified according to multiple categories including at least:

one other vehicle, that is separate and distinct from the autonomous vehicle;

a pedestrian; and a meteorological phenomenon;

modify or maintain, on the basis of the said information item, the associated nominal maximum travel speed value to be applied;

detect a defect or malfunction of the at least one external device; and switch to a degraded mode, the determination of the associated nominal maximum travel speed value, considering a worst case route course corresponding to the presence of the external element over the segment currently being traversed, the external element category corresponding to the category associated with a maximum reduction value for reducing speed, wherein the autonomous vehicle is driven at a particular speed by the autonomous driving module based on the associated nominal maximum travel speed value, wherein each category of external element is associated with a modification value for modifying the associated nominal maximum travel speed value, and wherein the modification value for modifying the nominal maximum travel speed value is a reduction value, and the reduction value associated with the external element category corresponding to the category 'other vehicle' is less than the reduction value associated with the external element category corresponding to the category 'pedestrian'.

* * * * *